(12) United States Patent
Sanders et al.

(10) Patent No.: US 10,306,307 B2
(45) Date of Patent: May 28, 2019

(54) AUTOMATIC CONFIGURATION OF VIDEO OUTPUT SETTINGS FOR VIDEO SOURCE

(71) Applicant: Apple Inc., Cupertino, CA (US)

(72) Inventors: Christopher J. Sanders, San Jose, CA (US); Christopher J. Kane, Cupertino, CA (US); Jad Osseiran, San Francisco, CA (US); James A. Young, Cupertino, CA (US); Ori Gersten, San Jose, CA (US); Patrick E. McClaughry, San Jose, CA (US); Vijay Sundaram, San Ramon, CA (US); Jano Banks, Cupertino, CA (US); Timur O. Starobinets, Lexington, MA (US); Bryan J. Follis, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/639,377

(22) Filed: Jun. 30, 2017

(65) Prior Publication Data
US 2019/0007731 A1    Jan. 3, 2019

(51) Int. Cl.
*H04N 21/4402* (2011.01)
*H04N 5/44* (2011.01)
(Continued)

(52) U.S. Cl.
CPC ....... *H04N 21/4402* (2013.01); *H04N 5/4401* (2013.01); *H04N 5/46* (2013.01);
(Continued)

(58) Field of Classification Search
CPC ....... H04N 21/25825; H04N 21/25833; H04N 21/6582; H04N 21/4402; H04N 21/43635;
(Continued)

(56) References Cited

U.S. PATENT DOCUMENTS

| 6,169,728 B1* | 1/2001 | Perreault | H04H 20/42 |
| | | | 348/E7.07 |
| 9,015,786 B2* | 4/2015 | Wolcott | H04B 15/00 |
| | | | 725/125 |

(Continued)

OTHER PUBLICATIONS

Saluste, Margus; "Change Screen Resolution and Text Size in Windows"; Dec. 19, 2014; https://www.winhelp.us/change-screen-resolution-in-windows.html; All pages (Year: 2014).*

*Primary Examiner* — Nicholas T Corbo
(74) *Attorney, Agent, or Firm* — BakerHostetler (57) ABSTRACT

Techniques are disclosed to select display settings for a display device. Device capabilities may be read from a display device and a determination made whether the device capabilities support other display formats than are read from the display, for example, a high dynamic range (HDR) format or a high resolution format. When the device capabilities do not include an format supported by a video source, video may be driven from the video source to the display device in the format and, if confirmation is received that the display device displays the driven video, settings may be stored for the display device identifying the format as a one supported by the display device. Additionally, interconnect may be tested by estimating noise levels generated by the interconnect to a network connection and/or by estimating network throughput both when video is driven over the interconnect and when it is not. Display formats may be selected for the device based on a maximum data rate of a network connection that can be maintained while the interconnect carries video.

32 Claims, 4 Drawing Sheets

(51) Int. Cl.
*H04N 5/46* (2006.01)
*H04N 7/01* (2006.01)
*H04N 21/442* (2011.01)
*H04N 21/462* (2011.01)
*H04N 21/4363* (2011.01)
*H04N 21/258* (2011.01)
*H04N 21/658* (2011.01)
*H04N 21/443* (2011.01)

(52) U.S. Cl.
CPC ..... *H04N 7/0117* (2013.01); *H04N 21/25825* (2013.01); *H04N 21/25833* (2013.01); *H04N 21/43635* (2013.01); *H04N 21/4424* (2013.01); *H04N 21/4432* (2013.01); *H04N 21/4621* (2013.01); *H04N 21/6582* (2013.01)

(58) Field of Classification Search
CPC .......... H04N 21/4424; H04N 21/4432; H04N 21/4621; H04N 5/4401; H04N 5/46; H04N 7/0117; G06F 15/16

See application file for complete search history.

(56) References Cited

U.S. PATENT DOCUMENTS

| | | | |
|---|---|---|---|
| 2002/0044570 A1* | 4/2002 | Gurusami | H04L 1/0057 370/487 |
| 2003/0033417 A1* | 2/2003 | Zou | G06F 3/023 709/230 |
| 2009/0073101 A1* | 3/2009 | Herz | G06F 3/14 345/98 |
| 2009/0073102 A1* | 3/2009 | Herz | G06F 3/14 345/98 |
| 2009/0079686 A1* | 3/2009 | Herz | G06F 3/14 345/100 |
| 2009/0079687 A1* | 3/2009 | Herz | G06F 3/14 345/100 |
| 2011/0025696 A1* | 2/2011 | Wyatt | G09G 5/363 345/502 |
| 2011/0228715 A1* | 9/2011 | Tsuji | H04N 21/2381 370/310 |
| 2012/0047526 A1* | 2/2012 | Hussain | G09G 5/005 725/25 |
| 2013/0120656 A1* | 5/2013 | Wilson | G06F 3/1462 348/563 |
| 2018/0063500 A1* | 3/2018 | Rusanovskyy | H04N 19/117 |
| 2018/0139258 A1* | 5/2018 | Margolin | H04L 47/19 |
| 2018/0152721 A1* | 5/2018 | Rusanovskyy | H04N 19/176 |

* cited by examiner

AUTOMATIC CONFIGURATION OF VIDEO OUTPUT SETTINGS FOR VIDEO SOURCE

BACKGROUND

The present disclosure relates to techniques for automated detection and application of display device settings and, particularly, to detection of such settings in environments when negotiation protocols between video sources and displays provide unreliable information.

Although modern video display environments vary widely, many of them share several basic characteristics. A video source provides video data to a display device over a connection such as a wired cable or wireless communication link (collectively, "interconnect"). The video source and the display device each may support a variety of display formats. Various interconnect communication protocols have been developed not only to permit the devices to exchange video but also to permit the devices to exchange information about their capabilities. The High-Definition Multimedia Interface ("HDMI") protocol is an example of one such protocol. The protocol supports exchange of Extended Display Identification Data ("EDID"), a data structure provided by a digital display to describe its display capabilities to a video source.

The inventors have determined that, in some circumstances, display devices do not provide accurate information regarding their capabilities via these protocols. For example, display devices that communicate with video sources according to an HDMI 1.4 protocol may not describe all display modes that the devices support, particularly high dynamic range formats and/or high definition formats such as 4K. When a video source selects a display format based solely on the device capabilities that are reported to it through the interconnect communication protocol, it is possible that the video source will select a display format that is sub-optimal for the device.

Compounding the problem, the inventors have determined that video sources sometimes select display modes that cannot be supported due to ambient interference. For example, many display formats involve use of data rates that approximate the frequencies of wireless transceivers, such as WiFi and Bluetooth transceivers (e.g. 2.4 GHz). At such frequencies, a poorly shielded interconnect may generate interference to such transceivers. A video source that selects a display format based solely on the reported capabilities of a device may select a format that cannot be supported due to such interference because, for example, a network connection that downloads video to be displayed on the device could not support a download bandwidth that would be necessary to support the video format in the presence of noise generated by the interconnect. Further, other ambient interference sources may operate intermittently, which, when coupled with interconnect generated noise, may cause certain display formats to be supportable at some times but be unsupportable at other times.

The inventors, therefore, have identified a need in the art for a technique to select a display format to provide to display devices that maximize display capabilities of a connected display device and are tailored for an operating environment in which the display is used.

DETAILED DESCRIPTION

Embodiments of the present disclosure provide techniques to select display settings for a display device. Device capabilities may be read from a display device and a determination made whether the device capabilities support other display formats than are read from the display, for example, a high dynamic range (HDR) format or a high resolution format. When the device capabilities do not include an format supported by a video source, video may be driven from the video source to the display device in the format and, if confirmation is received that the display device displays the driven video, settings may be stored for the display device identifying the format as a one supported by the display device. In another embodiment, interconnect may be tested by estimating noise levels generated by the interconnect to a network connection and/or by estimating network throughput both when video is driven over the interconnect and when it is not. Display formats may be selected for the device based on a maximum data rate of a network connection that can be maintained while the interconnect carries video.

Figure 1:
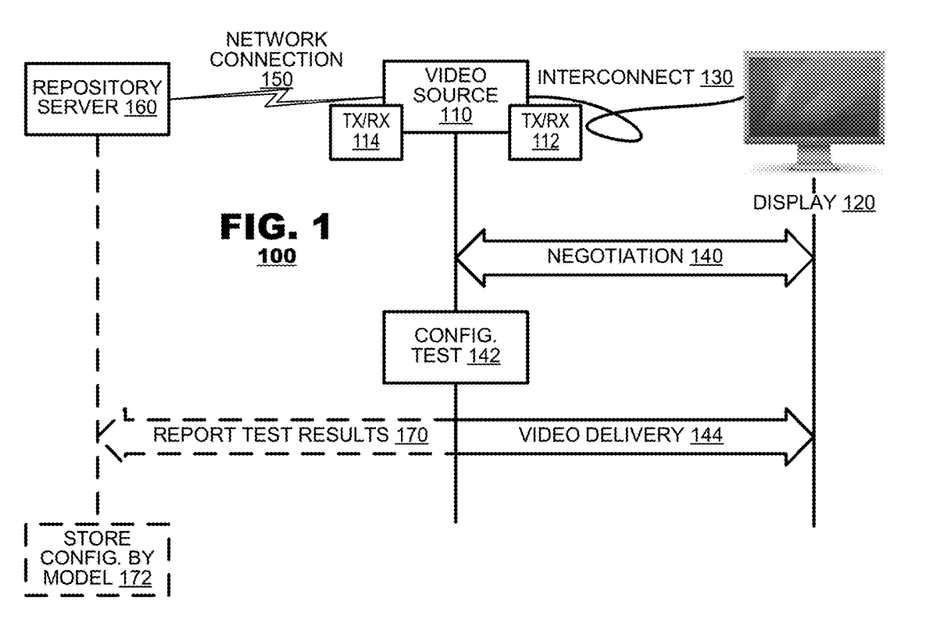
FIG. 1 is a functional block diagram of a display system 100 according to an embodiment of the present disclosure.

FIG. 1 is a functional block diagram of a display system 100 according to an embodiment of the present disclosure. The system 100 may include a video source 110 and a display device 120 connected by a interconnect 130. The video source 110 and the display 120 may engage in mutual communication via the interconnect 130. The communication may occur in several phases include a negotiation phase 140, a configuration testing phase 142, and a video delivery phase 144.

The negotiation phase 140 may commence during device startup when the video source 110 or the display 120 (or both) begin operation. During the negotiation phase, the video source 110 and the display 120 each may exchange messaging to confirm operation of the other device on the other end of the interconnect 130 and to determine each other's capabilities. For example, the display 120 may exchange Extended Display Identification Data (EDID), DisplayID data or Dolby Vision data, through which a display 120 may identify its make, model and/or revision number, and identify display format(s) that are supported by the display 120.

The configuration testing phase 142 may be performed as part of the negotiation phase; for ease of discussion, it is illustrated separately from other parts of the negotiation phase in FIG. 1. During the configuration testing phase 142, a video source 110 may perform various tests of the display device 120 and/or the interconnect 130 to determine a display format that can be supported by the system 100. In one embodiment, the configuration testing phase 142 may determine if the display device 120 supports higher-quality display formats than the display 120 identified by its EDID message. In another embodiment, the configuration phase 142 may determine a maximum data rate that can be supported by a network connection based on interference noise generated by the interconnect.

During the video delivery phase 144, video may be delivered from the video source 110 to the display 120 over the interconnect 130. The video source 110 may receive video to be rendered from a media source (not shown) via a network connection 150, such as WiFi or Bluetooth. The video source 110 may reconfigure the received video for delivery to the display 120. For example, video may be reformatted according to a display format selected as a result of the negotiation phase 140 and the configuration testing phase 142.

In an embodiment, the configuration testing phase 142 need not be performed in its entirety each time the video source 110 and the display 120 start up. For example, if results from one iteration of the configuration testing phase determine that a display device 120 can accept video in a format that exceeds the quality of the format(s) identified in an EDID message, the results may be stored persistently at the video source 110 for use at some point when another startup operation is performed. On the other hand, a video source 110 may repeat a configuration test phase 142 periodically to reassess interference noise generated by the interconnect 130. It is expected that system designers will select portions of the configuration testing phase to be repeated and a rate at which they will be repeated to suit their own needs.

The techniques proposed herein may be applied with a variety of video sources, including, for example, digital media players (such as the Apple TV player system), set top boxes, gaming consoles, computers, video capture devices and other types of display controllers. Similarly, the proposed techniques may be applied to a variety of display devices such as LCD- and/or LED-based displays, video projectors, and the like. The types of video sources and types of display devices are immaterial to the present discussion unless described herein.

In an embodiment, the video source 110 may be provided in communication with a repository server 160 via the network connection 150. The video source 110 may report results of a configuration testing phase 142 to the repository server 160 (msg. 170) where it may be stored. For example, the repository server 160 may build a database of different display configurations selected for display devices and the makes and/or models of displays to which they refer. The database may become a resource for other video sources 110 (not shown) that perform their own configuration tests.

In the example of FIG. 1, the interconnect 130 is illustrated as a wired connection (for example, an HDMI cable) that connects the video source 110 to the display 120. As indicated, the interconnect 130 may be provided by a wireless connection instead, for example a wireless HDMI communication link. In either case, the video source 110 may include an interconnect transceiver 112 that communicates with the display 120 over the interconnect by a governing communication protocol. The video source 110 also may include a network transceiver 114 that communicates to other networked devices via the network connection 150 over which the video source 110 downloads video to be displayed and communicates with the repository server 160. For example, the network transceiver 114 may be a WiFi or Bluetooth transceiver.

Figure 2:
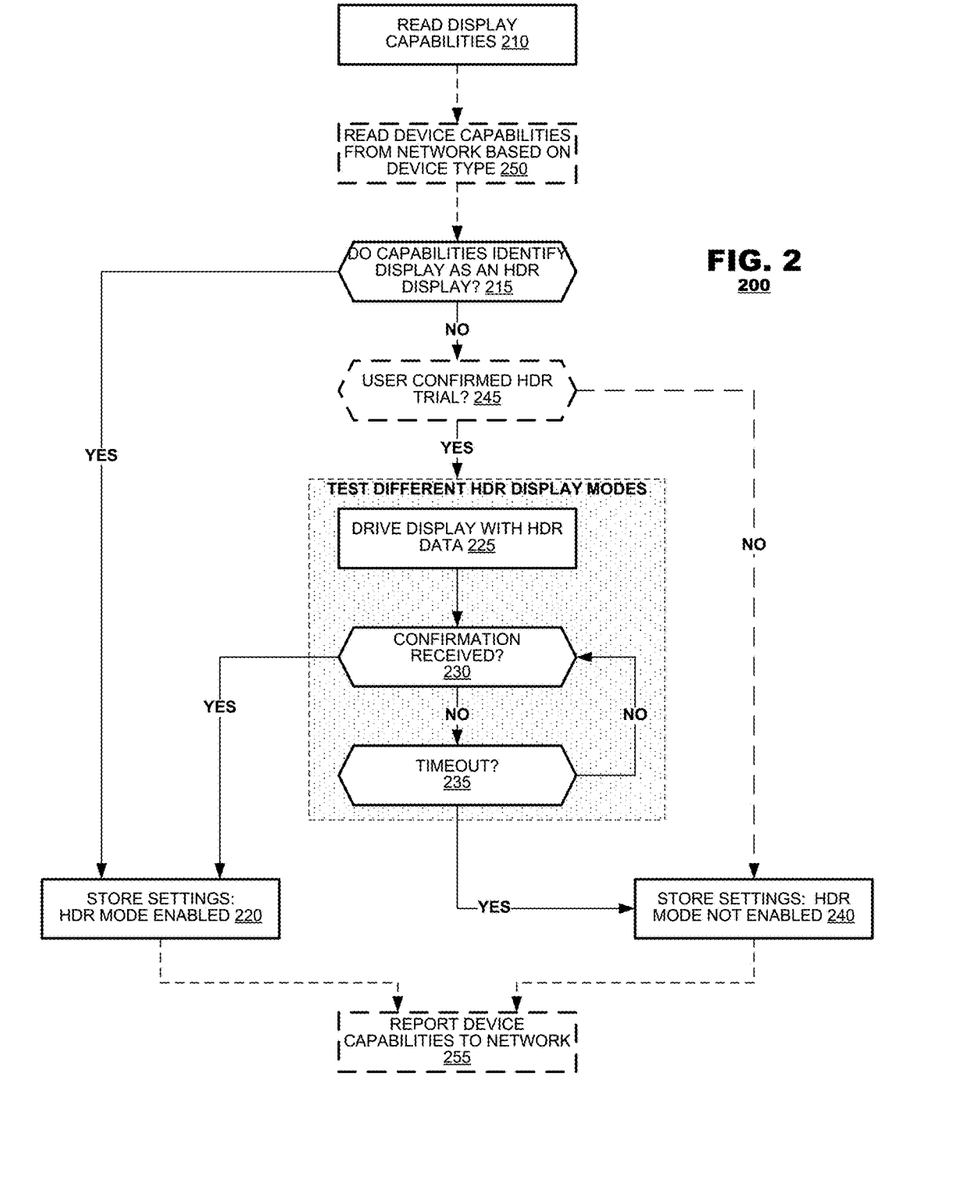
FIG. 2 illustrates a method according to an embodiment of the present disclosure.

FIG. 2 illustrates a method 200 according to an embodiment of the present disclosure. The method 200 may begin by reading display capabilities from a display device (box 210). The method 200 may determine from the display candidates whether the display device identifies itself as an HDR display (box 215). If so, the method may store settings for the device that the display is an HDR device (box 220). If not, the method 200 may engage a test protocol in which it drives the display with HDR data (box 225) and determines whether a confirmation is received (box 230) that the display device is displaying the HDR data. If the method 200 determines that a confirmation has been received that the display device is displaying the HDR data, the method 200 may store settings for the device that the display is an HDR device (box 220).

The method 200 may continue with the test protocol by driving the display and looking for a confirmation (boxes 225, 230) until a timeout condition is met (box 235). If the timeout condition occurs (box 235) without a confirmation being received, the method 200 may store settings associated with the display that an HDR format is not enabled (box 240). The method 200 may store other settings associated with the display device, for example, by storing settings associated with the display capabilities read at box 210.

The method 200 may engage a test protocol to determine if a display is HDR-capable even when the display fails to identify itself as HDR-capable during device negotiation. Accordingly, operation of the method 200 is expected to achieve better viewing conditions for such devices than would be achieved by video sources that engage displays based solely on their capabilities as reported during device negotiation.

In an embodiment, the method 200 may test a variety of different HDR capabilities to identify a highest-quality mode of display that is supported by a given device. In one example, the method 200 may operate over a progression of display formats testing, for each format, whether confirmation is received from an operator that the display device successfully rendered data in the respective format. The method 200 may begin the test starting with a format that is higher than the highest format reported by the device as being supported.

In an embodiment, HDR confirmation (box 230) may be received from operators that are viewing the display device as the test protocol is engaged. For example, operators may be prompted to indicate whether a display is properly displaying data as the display is driven with HDR data. Operators may do so by entering appropriate confirmations by a predetermined command on a remote control device, a control panel of the display or by another appropriate user interface controls.

In another embodiment, an HDR confirmation (box 230) may be derived from errors reported by a display over the interconnect. For example, the HDR confirmation may be determined by assessing a rate of reported errors provided by a display according to the HDMI protocol. If the rate of reported errors exceeds a threshold, the method 200 may determine that the HDR format under test cannot be supported.

In an embodiment, operators may be prompted to determine if they desire to engage the test protocol (box 245) before it is engaged. In such an embodiment, the test protocol may be engaged if the user confirms that it should be performed. If the user declines to perform the test, then the method 200 may store settings associated with the device according to the capabilities determined through device negotiation; in this case, the method 200 may store settings that the HDR display mode is not enabled.

In another embodiment, the method 200 may interact with a network repository 160 (FIG. 1) that stores results of test protocols performed on other devices. The repository 160 may store data identifying various devices on which test protocols were performed, for example, according to make, model and/or revision number, and data representing an outcome of the display test. In such an embodiment, once device capabilities are read from the device (box 210), the method 200 may communicate with the repository 160 and read device capabilities from the repository 160. For example, the method 200 may provide data on the device's make, model and revision number and retrieve from the repository 160 information on device capabilities. At box 215, when the method 200 determines whether the display capabilities identify the device as an HDR device, the method 200 may perform the determination using device capability data from the repository 160. In an embodiment, if the display capability data as reported by the repository 160 indicates that the display is not HDR capable, the method 200 may advance directly to box 240 (path not shown).

In an embodiment, at the conclusion of a test protocol, the method 200 may report an outcome of the test to a repository 160 (FIG. 1). In this manner, data may be aggregated over a variety of different instances of the method 200, each operating on their own displays, to build a database of device capabilities.

Alternatively, the method 200 may determine at box 215 whether there are display formats that are supported by a video source that are not included in the display capabilities reported by the display. For example, it may occur that a video source supports a high resolution format (e.g., 4K) that is not included in the display capabilities read from the display device. In boxes 225-235, the method 200 may test different display formats to determine if those formats are supported by the display device notwithstanding their omission from the display capabilities information read from the display device. For example, the method 200 may test a 1080p format, a 1080i format, a 4K ultra high definition ("UHD") format, and an 8K UHD format. And, if confirmation is received that a given display format is supported by the display, settings may be stored in box 220 identifying the respective format as one that is supported by the display device.

In some use cases, intermediate processing devices may be provided along a communication pathway between the video source 110 and a display 120. For example, a video source 110 may be provided in communication with an audio/video receiver (AVR) and the AVR relays video to a display device 120. In such applications, it may occur that an AVR may reject HDR formatted video that is sent to it. In an embodiment, rejection of an HDR format by an AVR device may cause the associated format to be disqualified from use.

Figure 3:
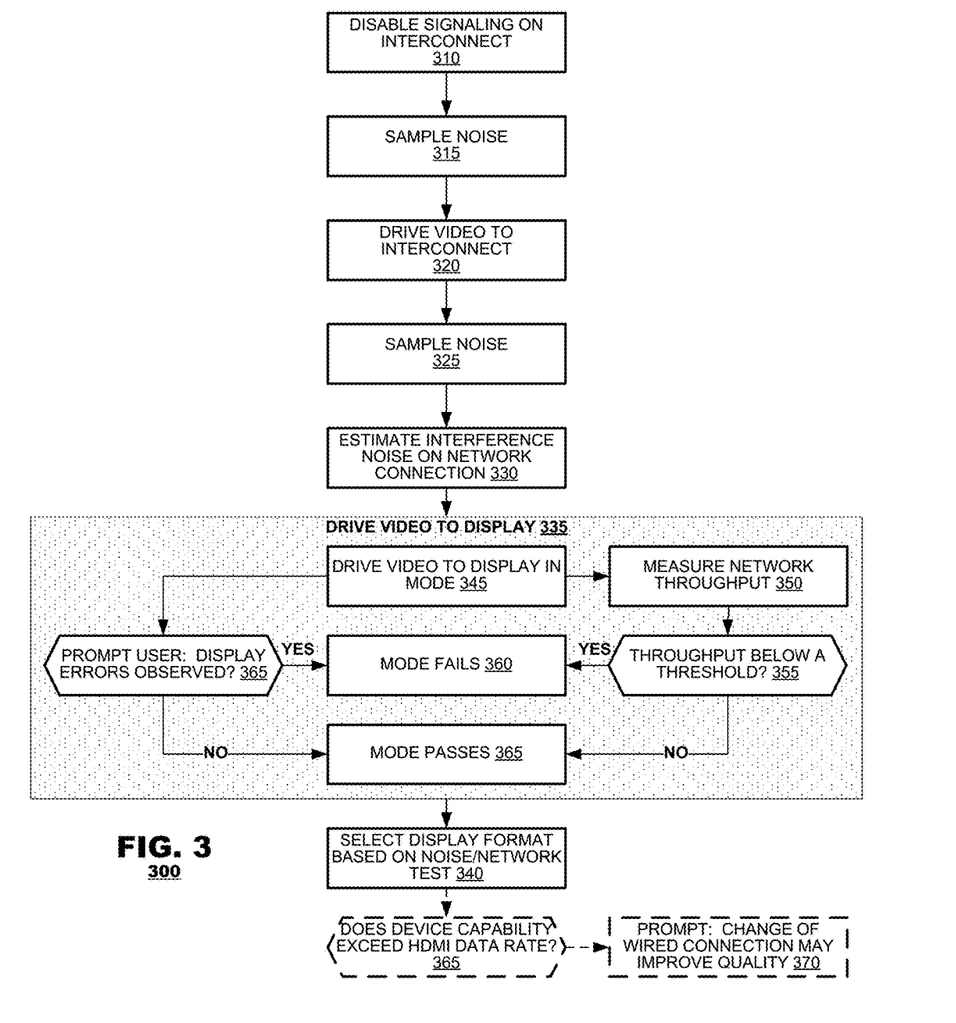
FIG. 3 illustrates a method for testing capabilities of a interconnect between a video source and a display device according to an embodiment of the present disclosure.

FIG. 3 illustrates a method 300 for testing capabilities of a network connection according to an embodiment of the present disclosure. The method 300 may disable signaling over the interconnect (box 310) and sample a signal received by a video source via a network transceiver 114 (FIG. 1) (box 315). The method 300 may drive video to the interconnect (box 320) and sample a signal received at the video source via the network transceiver 114 (box 325). Both sampled signals may be taken as an estimate of noise generated by the interconnect. The method 300 may compute a noise contribution of the interconnect to the network connection differentially from the noise estimates (box 330).

The method 300 also may perform a test of the network connection by driving video to the display (box 335) and selecting a video format based on the noise estimate and a network throughput test (box 340). The video format may be selected based on a maximum data rate that can be supported by the network connection while video is driven to the display. For example, it may occur that, although a display supports rendering of 4K video, the interconnect would generate such high levels of interference to a network connection 150 when carrying 4K video that the video source 110 could not download video fast enough to support a 4K stream. The method 300 may store qualified video format(s) as an operational parameter of a video source that will supply video to the display device.

The video test (box 335) may be performed in a variety of ways. In a first embodiment, the method 300 may drive video to the display in a variety of display modes (box 345) and, for each display mode, measure throughput of a network connection as video is driven (box 350). The method 300 may compare the network throughput to a threshold associated with the display mode (box 355). If the network throughput falls below the threshold, the method 300 may fail the display mode (box 360). Otherwise, the method 300 may pass the display mode (box 365). As indicated above, the throughput thresholds of each mode may be derived from a minimum network data rate that is required to support the respective display mode.

In another embodiment, the method 300 may drive video to the display in a variety of display modes (box 345) and determine if display errors are observed on the display (box 365). If display errors are observed, then the method 300 may fail the display mode (box 360) but, if display errors are not observed, then the method 300 may pass the display mode (box 365). The method 300 may cycle through a variety of candidate display modes of increasing bit rate. When a display format is encountered that fails, then the method 300 may discontinue the display mode test (box 335) and apply a highest quality display format that had passed according to the test.

Of course, the techniques of boxes 350-355 and box 365 may be performed cooperatively with each other. In such an embodiment, the method 300 may fail a given display mode if display errors are observed or if network errors exceed a predetermined threshold.

In a further embodiment, the method 300 may compare the selected display format with a device capability reported by the display, for example, during device negotiation or a display capability reported from a device repository. The method 300 may determine if a selected display format is below a highest-quality format supported by the device (box 375). If so, the method 300 may display a prompt to an operator that a change of the interconnect (for example, to a more heavily shielded cable) may permit the video source to display higher quality video than a currently-selected mode (box 380).

In an embodiment, the method 300 may iteratively test a variety of display formats each having an incremental increase in data rate over the interconnect. Consider, for example, a display device that provides display capability information via Dolby TV data. In such an embodiment, the display may identify itself as capable of supporting HDR data. The method 300 may test a variety of HDR formats at escalating data rates to determine a highest data rate that can be supported. For example, the method 300 may test a display format using 4:2:0 chroma subsampling. If an operator confirms that display of the subsampled video occurs without perceptible errors, the method 300 may test a display format using 4:2:2 subsampling, which increases data rate across the interconnect. The method 300 may test video at increasing data rates until display errors are encountered or the operator otherwise aborts the test.

The principles of the present disclosure of course permit a test protocol that combines the operation of the methods 200 and 300. In this case, interconnect error rates may be monitored at the same time different display formats are tested. Display formats will be used only if a given display device supports the format and the format can be displayed without artifacts.

Embodiments of the present disclosure permit converse operations to be performed to test interference generated by network communication devices 114 (FIG. 1) to an interconnect. In such an example, a level of interference may be estimated when a network transceiver transmits actively and when the network transceiver is dormant. For example, the interference may be estimated from HDMI errors reported by a display device during these test intervals. The errors may be compared to predetermined thresholds and, based on the comparison, associated data rates may be qualified or disqualified from use.

Figure 4:
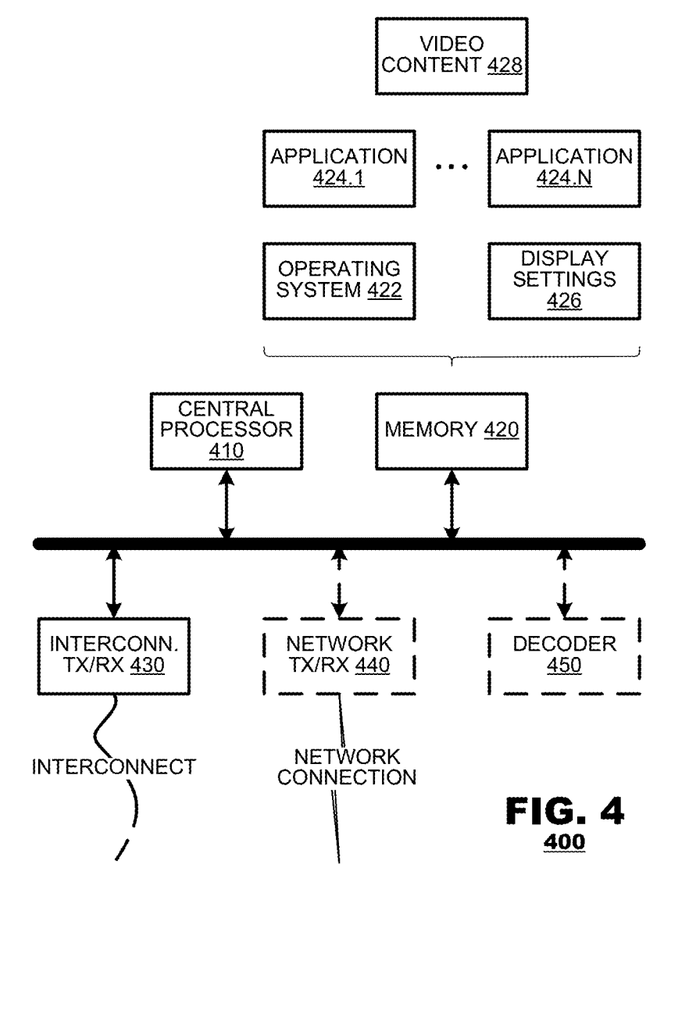
FIG. 4 is a block diagram of an exemplary video source according to an embodiment of the present disclosure.

FIG. 4 is a block diagram of an exemplary video source 400 according to an embodiment of the present disclosure. The video source 400 may include a central processor 410, a memory 420, and an interconnect transceiver 430 provided in communication with one another.

The central processor 410 may read and execute various program instructions stored in the memory 420 that define an operating system 422 of the video source 400 and various applications 424.1-424.N. The program instructions may cause the central processor 410 to perform the methods described hereinabove to select appropriate settings for the display device (FIG. 1) and to drive video to the display device. Once such settings are selected, data identifying those settings 426 may be stored in the memory. The memory 420 may store the program instructions 422, 424.1-424.N and settings 426 on electrical-, magnetic- and/or optically-based storage media.

The interconnect transceiver 430 represents a processing system that governs communication with the display device (not shown) over the interconnect. The interconnect transceiver 430 may generate signals on the interconnect that conform to governing protocol(s) on which the interconnect operates.

The video source 410 also may possess a network transceiver 440 that interfaces the video source 400 to other network devices via a network connection 150 (FIG. 1). The network transceiver 440 may generate signals on the network that conform to governing protocol(s) on which the network operates. As part of its operation, the network transceiver 440 may measure noise characteristics of the network connection, for example, by estimating bit error rates and other noise effects present on the network connection.

Communication with the repository server 160 may occur via the network transceiver 440. Also, the video source 400 may download video to be displayed from various sources (not shown), for example, on the Internet. The video source 400 also may include video decoder(s) 450 that apply video decompression operations to video received from the network before providing the video to the display.

Several embodiments of the present disclosure are specifically illustrated and described herein. However, it will be appreciated that modifications and variations of the present disclosure are covered by the above teachings and within the purview of the appended claims without departing from the spirit and intended scope of the disclosure.

We claim:

1. A method, comprising:
   reading device capabilities from a display device,
   determining whether the device capabilities include all formats supported by a video source;
   when the device capabilities do not include all formats, driving video in a format of the video source that is omitted from the device capabilities to the display device,
   when confirmation is received that the display device displays the driven video, storing settings for the display device identifying the display device as capable of displaying the driven format.

2. The method of claim 1, wherein the driven video is in a high dynamic range video format.

3. The method of claim 1, wherein the driven video is at a resolution higher than a resolution associated with formats of the device capabilities.

4. The method of claim 1, wherein when a timeout condition is reached without receiving the confirmation, disqualifying the driven display format as a capability of the display device.

5. The method of claim 1, wherein the confirmation is received from an operator of the display device.

6. The method of claim 1, further comprising, prior to the driving, prompting an operator to perform a capability test, wherein the driving is performed in response to an operator response to the prompt.

7. The method of claim 1, further comprising, after the reading, reading device capabilities of the device from a network repository.

8. The method of claim 1, further comprising, after the storing, transmitting device settings to a network repository identifying the display device as capable of displaying the driven format.

9. The method of claim 1, further comprising
   estimating a level of interference noise generated by an interconnect over which the video is driven to the display device,
   when the estimated level of interference noise exceeds a predetermined threshold, disqualifying the driven display format from use with the display device.

10. The method of claim 1, further comprising
    estimating a level of errors generated by a network transceiver in an interconnect that carries video to the display device,
    disqualifying a candidate display format from use based on the estimated errors.

11. The method of claim 1, further comprising
    responsive to an operator input indicating that the display device displays the driven video format with errors, disqualifying the driven display format from use with the display device.

12. A video source, comprising;
    an interconnect transceiver for connection to a display device via an interconnect, and
    a processor and a memory, the processor to:
       read device capabilities from a display device via the interconnect,
       determine whether the device capabilities include all formats supported by the video source;
       when the device capabilities do not include all formats, drive video in a format of the video source that is omitted from the device capabilities to the display device,
       when confirmation is received that the display device displays the driven video, store in the memory settings for the display device identifying the display device as capable of displaying the driven format.

13. A non-transitory computer readable medium storing program instructions that, when executed by a processing device, cause the device to:

read device capabilities from a display device, determine whether the device capabilities include all formats supported by a video source;

when the device capabilities do not include all formats, drive video in a format of the video source that is omitted from the device capabilities to the display device, when confirmation is received that the display device displays the driven video, store settings for the display device identifying the display device as capable of displaying the driven format.

14. The medium of claim 13, wherein the driven video is in a high dynamic range video format.

15. The medium of claim 13, wherein the driven video is at a resolution higher than a resolution associated with formats of the device capabilities.

16. The medium of claim 13, wherein the program instructions further cause the processing device to, when a timeout condition is reached without receiving the confirmation, disqualify the driven display format as a capability of the display device.

17. The medium of claim 13, wherein the program instructions further cause the processing device to, prior to the driving, prompt an operator to perform a capability test, wherein the driving is performed in response to an operator response to the prompt.

18. The medium of claim 13, wherein the program instructions further cause the processing device to, after the reading, read device capabilities of the device from a network repository.

19. The medium of claim 13, wherein the program instructions further cause the processing device to, after the storing, transmit device settings to a network repository identifying the display device as capable of displaying the driven format.

20. The medium of claim 13, wherein the program instructions further cause the processing device to:

estimate a level of interference noise generated by an interconnect over which the video is driven to the display device, when the estimated level of interference noise exceeds a predetermined threshold, disqualify the driven display format from use with the display device.

21. The medium of claim 13, wherein the program instructions further cause the processing device to:

estimate a level of errors generated by a network transceiver to an interconnect that carries video to the display device, disqualify a candidate display format from use based on the estimated errors.

22. The medium of claim 13, wherein the program instructions further cause the processing device to, responsive to an operator input indicating that the display device displays the driven video format with errors, disqualify the driven display format from use with the display device.

23. A method comprising:

sampling first noise from a network connection at a time when an interconnect between a video source and a display carries video data, and sampling second noise from the network connection at another time when the interconnect does not carry video data;

estimating a level of interference noise generated by the interconnect based on the first and the second noise; and selecting a data rate of a subsequent video to transmit over the interconnect based on the estimated noise.

24. The method of claim 23, further comprising:

driving video over the interconnect in a candidate display format at the selected data rate, responsive to a confirmation that the video is displayed without error, storing the candidate display format as a setting of the display device.

25. The method of claim 23, further comprising estimating a throughput of a network connection when the interconnect carries video data, wherein the data rate selection also is based on the estimated throughput.

26. The method of claim 23, further comprising:

estimating a level of errors generated in the interconnect by a network transceiver, disqualifying a candidate display format from use based on the estimated errors.

27. The method of claim 23, further comprising:

driving video over the interconnect in a candidate display format at the selected data rate, estimate transmission errors over the interconnect, when the estimated transmission errors are below a predetermined threshold, storing the candidate display format as a setting of the display device.

28. The method of claim 23, further comprising, until an error condition is reached:

driving video over the interconnect in candidate display formats at an increasing succession of data rates, storing candidate display formats that do not cause the error condition as respective settings of the display device.

29. The method of claim 23, further comprising:

reading device capabilities from the display device, driving video to the display device in a format that corresponds to the selected data rate;

when confirmation is received that the display device displays video in the format, storing settings for the display device identifying the format as a capability of the device.

30. The method of claim 29, further comprising, after the storing, transmitting device settings to a network repository identifying the display device as capable of displaying the driven format.

31. The method of claim 23, further comprising:

reading device capabilities of the display device from a network repository, driving video to the display device in a format that corresponds to the selected data rate;

when confirmation is received that the display device displays video in the format, storing settings for the display device identifying the format as a capability of the device.

32. The method of claim 23, further comprising:

reading device capabilities from the display device, determining if there are device capabilities of the display device that involve data rates that exceed the selected data rate, and when there are device capabilities of the display device that involve data rates that exceed the selected data rate, providing a notification.

* * * * *